United States Patent [19]

Malish et al.

[11] 4,433,931
[45] Feb. 28, 1984

[54] ADAPTER DEVICE FOR BROOMS OR THE LIKE

[76] Inventors: Terrance J. Malish, 2520 Red Fox Pass, Willoughby Hills; Lawrence A. Somrack, 2397 Somrack Dr., Willoughby, both of Ohio 44094

[21] Appl. No.: 219,301

[22] Filed: Dec. 31, 1980

[51] Int. Cl.³ .......................... F16B 9/00; F16L 41/00
[52] U.S. Cl. .................................. 403/194; 403/361; 403/263; 403/287
[58] Field of Search .............. 403/192, 194, 201, 248, 403/253, 255, 263, 276, 277, 287, 296, 301, 306, 361, 406

[56] References Cited

U.S. PATENT DOCUMENTS

| | | | |
|---|---|---|---|
| 2,150,651 | 3/1939 | Ewing | 403/201 |
| 2,442,684 | 6/1948 | Greene | 403/361 |
| 2,744,777 | 5/1956 | Mucher | 403/301 X |
| 2,975,004 | 3/1961 | Safianoff | 403/361 X |
| 3,152,820 | 10/1964 | Giampa et al. | 403/361 X |
| 3,192,622 | 7/1965 | Bannerman | 403/301 X |
| 3,604,565 | 11/1967 | Freeman | 403/361 X |
| 3,667,787 | 6/1972 | Semour | 403/361 |
| 4,003,668 | 1/1977 | Kelly et al. | 403/287 |
| 4,127,342 | 11/1978 | Coggiola | 403/361 |
| 4,257,575 | 3/1981 | Runyan | 403/248 X |

FOREIGN PATENT DOCUMENTS

| | | | |
|---|---|---|---|
| 2702316 | 7/1978 | Fed. Rep. of Germany | 403/287 |

Primary Examiner—Wayne L. Shedd

[57] ABSTRACT

A coupler device made from a polymeric material for detachably connecting a broom, brush, mop or the like to a handle member, the device including a generally hollow, elongated body having an exterior male threaded portion adapted for threading attachment within a corresponding female threaded socket portion in the broom, brush, mop or the like. The body includes a multiple diameter bore defining an interior shoulder portion adapted to abuttingly receive the end of a hollow handle having a passageway therein, and an integral, elongated post portion extending axially through the bore adapted to be engageably received in the passageway in the handle for securement of the device thereto. In another form, a reinforcement element is fixed within the bore in the post portion for strengthening the coupling with the handle member.

19 Claims, 6 Drawing Figures

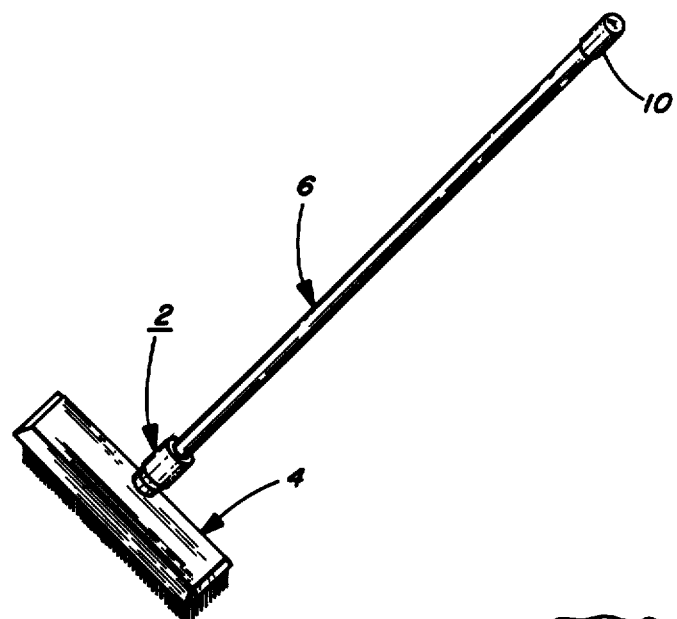
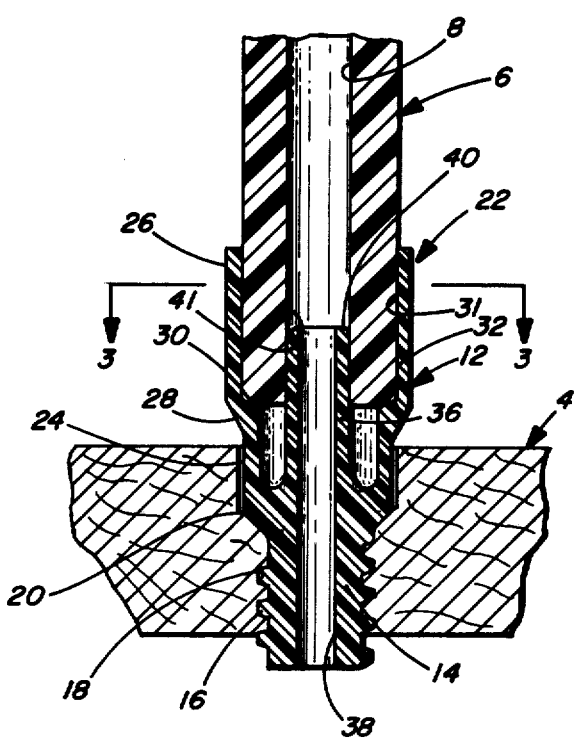
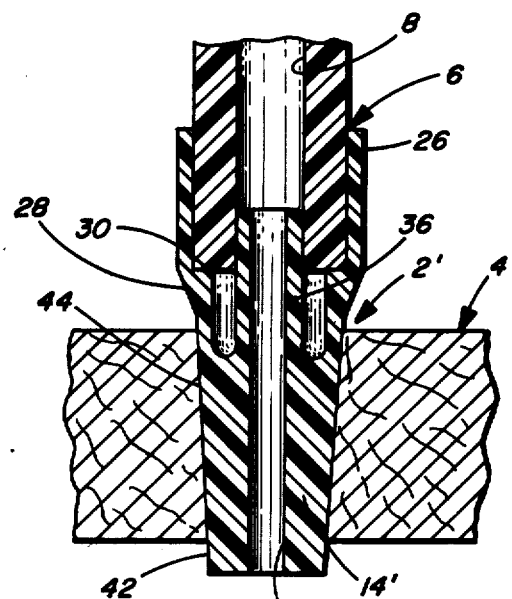
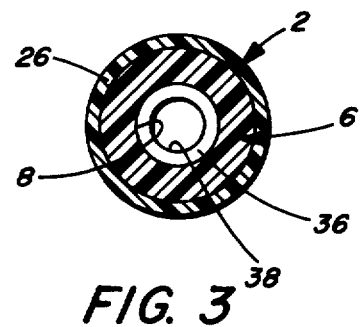
FIG. 1
FIG. 2
FIG. 3
FIG. 4

ADAPTER DEVICE FOR BROOMS OR THE LIKE

BACKGROUND OF THE INVENTION

The present invention relates to an improved arrangement for detachably connecting a broom, brush, mop or the like to a handle. The invention is especially suited for use with heavy duty commercial and/or industrial brooms such as commonly referred to as the "push-broom" types. Heretofore, various adapters or locking devices have been provided for detachably securing the working end portion (i.e. broom, brush, mop or the like) to a handle. One such type has included the conventional wooden or metal handle and/or wooden or metal type construction for direct threaded attachment to such corresponding working end portion. Because of the tendency of these threaded arrangements to break or fracture various auxiliary brace or clamp devices have been provided to impart additional strength and stability to the connection particularly for heavy-duty applications utilizing relatively heavy and large sized push-type brooms, etc. A primary difficulty in such prior connections resides in the inability of the connection to "give" during twisting or torquing resulting in breaking or fracturing after repeated usage. More recently, efforts have been made to provide hollow plastic adapters having a press-fit on the handle end and a threaded connection to the working end portion. However, it has been found that such prior adapter devices are not entirely satisfactory in preventing breaking or fracturing particularly when subjected to heavy duty application. More specifically, it has been found that the shear and/or torque forces are not adequately distributed by such prior plastic adapter devices in order to withstand the relatively heavy load forces imparted to the connection between the associated component parts such that the device tends to snap-off generally at the exterior juncture or seat with the working end portion. In addition, such prior adapter devices are not especially adapted for use with current handles which are of a hollow construction, but which handles have high strength yet relatively light weight characteristics. One such prior plastic adapter is disclosed in U.S. Pat. No. 4,003,668 dated Jan. 18, 1977.

DISCLOSURE OF INVENTION

The present invention relates to a new and improved construction for a coupler device made from a polymeric material adapted for use in detachably connecting a broom, brush, mop or the like to an elongated handle preferably of a hollow construction. The device, in one form, includes an elongated, generally cylindrical body member having a nose portion with exterior thread means defining a male end adapted for threaded connection into a correspondingly threaded female socket in the broom, brush, mop or the like. The body member includes at its other end an elongated, hollow sleeve made integral with the nose portion and adapted to engageably receive an end of a handle of the type having a hollow construction. The sleeve includes an interior reduced diameter section defining a circumferential shoulder portion adapted for abutting co-acting engagement with the a handle end. An elongated post member preferably of a hollow construction is made integral with and extends axially upwardly from the nose portion adapted to be engageably received within an axially extending passage defining the hollow handle. In another form, the nose portion is of a tapered construction so as to be press-fit into a corresponding tapered socket in the broom, brush, mop or the like. In a further form, a reinforcement element is fixed within the bore in the post portion to provide added strength to the coupling with the handle.

By the foregoing arrangement, as will become more fully apparent when reference is made to the accompanying drawings and following description, the present invention provides a polymeric coupler device which can be quickly and easily attached by a simple action with the end of the broom handle for threaded securement to the broom, brush, mop or the like. This construction and arrangement provides a coupling or interconnection between the handle and working end element-broom, brush, mop, etc.,—which is capable of providing a positive securement having improved strength yet good flexability characteristics to prevent breaking and/or fracturing of the coupling after repeated usage and when applied in relatively heavy duty work applications. Further, the coupling device of the present invention can be made of a relatively inexpensive yet high strength material having adequate flexability characteristics so as to afford relatively good surface and long life performance qualities during normal usage. In addition, the coupler device of the present invention is designed especially for elongated handles having a hollow construction which are made from high strength plastic materials for enhanced strength and service life characteristics. More specifically, the coupler device of the present invention is constructed and designed so as to have good strength and yet which provides a sufficient give or yield to withstand the relatively great bending, torque and twisting forces applied to the coupling path during normal usage. Further, the device of the invention provides a flow-through construction with the hollow handle to permit the introduction and/or removal of fluids (i.e. cleaning liquids or the like) to and/or from the brush, mop or the like.

BRIEF DESCRIPTION OF THE DRAWINGS

FIG. 1 is a generally prospective view illustrating the coupling device of the present invention for use in connection with a push-type broom;

FIG. 2 is a fragmentary, generally vertical section view illustrating the coupling device for detachably connecting the working end of the broom of FIG. 1;

FIG. 3 is a horizontal section view taken along the line 3—3 of FIG. 2;

FIG. 4 is a fragmentary, generally vertical section, view illustrating a modified form of the coupling device;

BEST MODE FOR CARRYING OUT THE INVENTION

Figure 5:
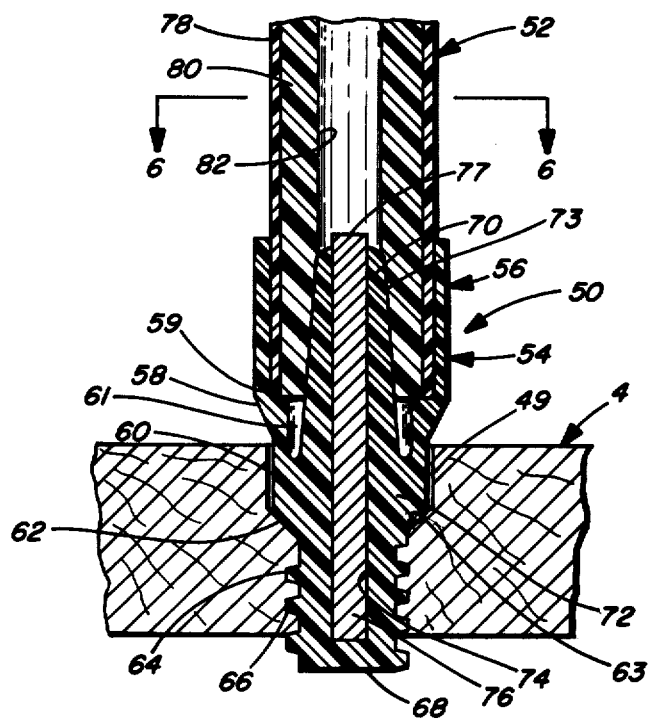
FIG. 5 is a fragmentary, generally vertical section view illustrating another form of the coupling device.

Referring again to the drawings and in particular to FIG. 1 thereof, there is illustrated the coupling device, designated generally at 2, of the invention adapted for use in detachably connecting a working end element 4, such as a broom, brush, mop or the like, to an elongated handle, designated generally at 6. It will be understood, however, that the coupling device 2 can be effectively employed in any type of broom, brush, mop or the like of the type for cleaning, scrubbing or polishing applications.

Preferably, in the invention the handle 6 is of an elongated, hollow construction having an axial passageway, as at 8, extending therethrough. For this purpose, the passageway 8 may extend throughout the length of the handle and may be provided with a cap element, as at 10, to provide a smooth and finished terminal end construction. In accordance with the invention, the handle is preferably made of a relatively light weight yet high strength material, such as fiberglass or the like which has non-conductive, properties for safety purposes.

As best illustrated in FIGS. 2 and 3, the coupling device includes an elongated generally cylindrical body member 12 including a nose portion 14 having an exterior threaded surface, as at 16. The surface 16 is disposed for threading coacting engagement within a female threaded socket, designated at 18, provided in the working end element 4. The nose portion 14 terminates in an annular tapered surface defining a seat portion 20 which provides an abutment and stop upon engagement with the confronting upper surface of the working end element 4. Accordingly, the coupling device 2 can be threaded into the female socket 18 until the seat portion bottoms-out against the confronting surface of the working end element 4. In the invention, the seat portion 20 may have an angle of inclination of approximately 40°, for example.

As shown, the seat portion 20 tapers upwardly and outwardly and merges into a generally cylindrical sleeve portion 22 having a lower reduced diameter section 24 and an upper elongated diameter section 26 which are integrally joined together by another tapered portion, as at 28, which together define an interior peripherial shoulder portion 30. The tapered portion 28 tapers upwardly and outwardly preferably at an angle of inclination of approximately 25°, whereas, the shoulder portion 30 has a generally planar ledge-like configuration so as to provide an abutment and stop for a corresponding edge portion, as at 32, of the handle 6. Accordingly, the upper sleeve section 26 has an open end having a diameter so as to slidably receive the transverse dimension of the handle 6 therein. Preferably, the upper sleeve section 26 has a diameter dimensioned so as to tightly receive in a generally slip-fit relationship the transverse dimension of the handle so as to frictionally retain the same therein. Also, it is to be understood that suitable adhesive materials, as at 31, may be utilized to increase the locking relationship between these component parts.

Now in accordance with the invention, an elongated, upstanding post portion 36 is made integral with and extends axially upwardly from the nose portion 14. The post portion 36 is preferably of a frusto-conical construction and is generally concentrically disposed within the sleeve portion 22 for axial registration within the passageway 8 provided in the handle 6. Preferably, the post portion 36 is of a hollow construction defined by a bore 38 extending therethrough and through for the purposes of transmitting fluids, such as liquids or the like through the nose portion 14. Accordingly, by this arrangement the post portion 36 provides an effective high strength locking engagement with the handle 6, but yet also enables the handle to have sufficient "give" or "yield" capability to enable the coupling device 2 to withstand severe torque forces without breaking or fracturing. It is preferred that the post portion 36 have an axial length so as to terminate inwardly of the open end of the sleeve section 26, but above the interior shoulder portion 30. In the form shown, the post portion 36 terminates generally at the mid-point in relation to the axial length of the upper sleeve section 26. The sleeve portion 36 has a terminal end which may be chamfered, as at 40, to facilitate insertion of the same into the passageway 8. In the invention, it is preferred that the post portion 36 have an outside diameter slightly greater than that of the corresponding diameter of the passageway 8 so as to be disposed in a press-fit relationship therein for frictionally retaining the handle in respect to the coupling device 2. Here again, suitable adhesive materials may be used, as at 41, to secure the parts.

In the embodiment illustrated in FIG. 4, the coupling device, designated at 2', is of the same general construction wherein like reference number refer to like parts. In this form, however, the nose portion 14' is of an elongated, tapered construction with a continuous, smooth tapered surface 42 which is press-fit into a correspondingly shaped female socket 44 in the broom, brush, mop or the like. Here also the tapered portion 28 has slightly reduced slope and merges into the upper sleeve 26 at one end and into the tapered nose portion 14' at the other end.

Figure 6:
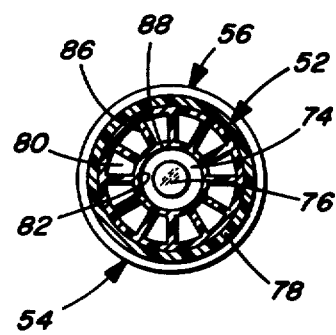
FIG. 6 is a horizontal section taken along the line 6—6 of FIG. 5.

In FIGS. 5 and 6, there is illustrated another embodiment of the invention wherein like reference numerals refer to like component parts thereof. Here again, the coupling device, designated generally at 50, is made from a polymeric material adapted for threaded connection into the working end element, as at 4, of the broom, brush, mop or the like. In this form, the device 50 includes an elongated generally cylindrical body 54 having a nose portion 72 adapted to be received within a correspondingly shaped opening or hole 49 provided in the work element 4. The coupling device 50 provides the interconnection between the work element 4 and a handle, designated generally at 52, adapted for detachable connection with the work element 4.

In the embodiment illustrated, the body 54 of the coupling device includes an annular tapered surface defining a step portion 58 which tapers downwardly and inwardly toward a cylindrical surface 60 adapted to be received within a correspondingly shaped cylindrical opening 49 in the work element 4. The cylindircal surface 60 extends axially downwardly and then merges into another downwardly and inwardly inclined surface 62 which provides a seat portion adapted to be received within a correspondingly shaped seat portion 63 provided in the work element 4. In this embodiment, the nose portion 72 terminates in a reduced diameter threaded nose end portion 64 which is externally threaded, as at 66, for threaded engagement within a correspondingly shaped threaded opening in the work element 4. In this form, the nose end portion 64 is closed at its terminal end, as at 68, to provide a closed construction.

The upper end of the body 54 again has a generally cylindrical sleeve portion defined by a cylindrical side wall 56. The sleeve portion terminates in the tapered step portion 58 which together with an annular cavity 61 define an interior peripherial shoulder portion 59 which acts as an abuttment for the handle 52 in the inserted condition thereof. Accordingly, this shoulder portion 59 generally corresponds in construction and function to the shoulder portions 30 in the embodiments of FIGS. 2 and 4.

In the embodiment illustrated, an elongated, upstanding post portion 70 is made integral with and extends axially upwardly from the nose portion 72. In this form, the nose portion 70 is of a generally frusto-conical configuration defined by an upwardly and inwardly extending conical surface 73. The post portion 70 is provided with an axial bore 74 adapted to receive a reinforcement element 76 therein. In the invention, the reinforcement element may be made from a metallic or polymeric material and of a solid or hollow core construction. At one end the reinforcement element 76 bottoms against the closed end 68 of the nose portion 72 and may project slightly upwardly at its opposed end 77 into an axial bore 82 provided in the handle 52. As will be seen, the post portion 70 is defined at its lower end by the annular cavity 61 which is disposed radially inwardly of the tapered surface step portion 58.

Now in the embodiment illustrated in FIGS. 5 and 6, the handle 52 may be of a composite construction defined by an inner cylindrical core member 80 made from a polymeric material which is surrounded by an outer casing or shell member 78 made from a polymeric material. As best illustrated in FIG. 6, the cylindrical core member 80 is defined by an axial bore 82 with the core member 82 being defined by an inner cylindrical wall portion 80 from which extends a plurality of radially extending web elements 86 defining elongated passageways, as at 80, extending longitudinally thereof. Accordingly, the handle 52 is of a composite, polymeric construction which is light weight and which provides adequate strength.

As best illustrated in FIG. 5, upon insertion of the handle 52 into the cylindrical sleeve 56, the upstanding post portion 70 mounting the pin element 76 is received within the bore 82 in the handle which acts to deform the core construction of the handle so as to conform the material of the core construction to the corresponding frusto-conical side wall 73 construction of the post portion 70. Accordingly, this coupling action, in effect, actually compresses the material of the handle within predetermined limits so as to maximize the strength characteristics of the coupling path defined by the coupling device 50 between the work element 4 and the handle 52.

In the embodiments illustrated, it is preferred that the coupling devices 2 and 50 be made of a unitary, one-piece construction from a polymeric material having high strength yet sufficient flexability characteristics to "yield" as may be necessary to withstand the relatively powerful impact forces applied either to the working end element and/or the handle. It has been found that the preferred polymeric materials may include glass or mineral filled nylon, non-reinforced nylon, polyethelene, or the like.

We claim:

1. A coupler device of the type for detachably mounting the working end element, such as a broom, brush, mop or the like, to a hollow handle of the type having a passageway therein, said coupling device comprising, an elongated circularly cylindrical body member, said body member being made from a polymeric material including a sleeve portion and a unitary nose portion, said nose portion being adapted for detachable securement within a corresponding socket portion provided in said working end element, a hollow circularly cylindrical sleeve portion made unitary with and extending outwardly away from said nose portion, said sleeve portion having an open end adapted to receive a free end of said handle, said sleeve portion defining a generally circularly cylindrical interior cavity having a unitary interior shoulder portion which extends laterally outwardly from said cavity and adapted for abutting coacting engagement with the end of said handle, said sleeve portion having a reduced diameter section and an enlarged diameter section defining said shoulder portion, said reduced diameter section being unitarily attached to said nose portion with said sections being disposed in generally concentric alignment with said nose portion, an upstanding post portion made unitary with and extending axially upwardly from said nose portion and adpated to be received in the passageway in said handle, said post portion having an axial bore extending therethrough, said post portion having a diameter and length sufficient to be received in frictional gripping engagement within the passageway in said handle, and with said post portion extending upwardly above the juncture of said nose and sleeve portions and terminating inwardly of the open end of said sleeve portion for holding said handle in secured and supported relation on said shoulder portion.

2. A coupler device in accordance with claim 1, wherein said nose portion is of a generally uniform diameter merging into and made integral with a tapered shank portion defining a seat for coacting abutting engagement with the confronting surface of said working end element in the installed position of said handle.

3. A coupler device in accordance with claim 1, wherein said post portion has an axial bore extending therethrough with said post portion being disposed in generally concentric alignment within said cavity and having a length at least substantially greater than one-half the axial length of said sleeve portion.

4. A coupler device in accordance with claim 1, wherein said post portion is of a cylindrical construction having a uniform diameter so as to be disposed in a frictional engagement within the passageway in said handle.

5. A coupler device in accordance with claim 1, wherein said nose and post portions have an axial bore extending therethrough, said post portion being disposed generally concentrically within said cavity and spaced radially inwardly from the interior surfaces of said cavity, and said post portion being dimensioned so as to be frictionally disposed in the passageway in said handle.

6. A coupler device in accordance with claim 1, wherein said nose portion is threaded for engagement in a corresponding threaded socket in said working end element.

7. A coupler device in accordance with claim 1, wherein said nose portion is tapered for press-fit engagement in a corresponding tapered socket in said working end element.

8. A coupler device in accordance with claim 1, wherein said post portion has an axial bore therein, and an elongated pin element being disposed within said bore.

9. A coupling device in accordance with claim 8, wherein said post portion has a frusto-conical exterior conjunction.

10. A coupling device in accordance with claim 9, wherein the exterior configuration of said post portion acts to compress the material of said handle in the installed position thereof.

11. A coupling device in accordance with claim 8, wherein said pin element is metal.

12. A coupler device in accordance with claim 1 wherein, said post portion extends axially above said shoulder portion and terminates inwardly of the terminal open end of said sleeve portion.

13. A coupler device in accordance with claim 11, wherein said post portion is externally tapered in a convergent direction away from said nose portion adapted for compressing the material of said handle against the confronting interior surface of said sleeve portion.

14. A coupler device of the type for detachably mounting the working end element, such as a broom, brush, mop or the like, to a handle of the type having a passageway extending at least from one end thereof, said coupling device comprising a unitary body member made from a polymeric material, said body member including a nose portion having external threads for threaded engagement within a corresponding threaded socket portion provided in said working end element, and a hollow, circularly cylindrical sleeve portion made unitary with and extending outwardly away from said nose portion, said sleeve portion having an open terminal end adapted to receive therein one end of said handle, said sleeve portion defining a generally circularly cylindrical interior cavity having a unitary interior shoulder which extends laterally outwardly from said cavity and is adapted to receive the said end of said handle, said nose portion having an axial bore extending therethrough and disposed in general concentric alignment with the circularly cylindrical interior cavity in said sleeve, an elongated reinforcement pin element disposed within the bore in said nose portion and extending outwardly into said cavity with a length sufficient to be disposed within the passageway in said handle for gripping securement of said handle within the cavity within said sleeve portion.

15. A coupler device of the type for detachably mounting the working end element, such as a broom, brush, mop or the like, to a handle of the type having a passageway extending at least from one end thereof, said coupling device comprising a unitary body member made from a polymeric material, said body member including a nose portion having external threads for threaded engagement within a corresponding threaded socket portion provided in said working end element, a hollow, circular cylindrical sleeve portion made integral with and extending outwardly away from said nose portion, said sleeve portion having an open terminal end adapted to receive therein one end of said handle, said sleeve portion defining a generally circular cylindrical interior cavity adapted to receive the said end of said handle, said nose portion having an axial bore extending therethrough and disposed in general concentric alignment with the circular cylindrical interior cavity in said sleeve, an elongated reinforcement pin element disposed within the bore in said nose portion and extending outwardly into said cavity with a length sufficient to be disposed within the passageway in said handle for gripping securement of said handle within the cavity within said sleeve portion.

16. A coupler device in accordance with claim 15, including an upstanding post portion made integral with and extending axially outward from the general juncture of said sleeve and nose portions, said post portion having an axial bore therein disposed in general concentric alignment with the interior cavity in said sleeve portion, and said pin element being disposed within the bore in said post portion and extending outwardly therefrom a distance sufficient to be received within the passageway in said handle.

17. A coupler device in accordance with claim 16, wherein said pin element is disposed in the bore of said nose portion and extends through the bore in said post portion and projecting outwardly beyond said post portion a distance sufficient to be received in the passageway in said handle.

18. A coupler device in accordance with claim 14, including an upstanding post portion made integral with and extending axially outward from the general juncture of said sleeve and nose portions, said post portion having an axial bore therein disposed in general concentric alignment with the interior cavity in said sleeve portion, and said pin element being isposed within the bore in said post portion and extending outwardly therefrom a distance sufficient to be received within the passageway in said handle.

19. A coupler device in accordance with claim 14, wherein said pin element is disposed in the bore of said nose portion and extends through the bore in said post portion and projecting outwardly beyond said post portion a distance sufficient to be received in the passageway in said handle.

* * * * *